United States Patent [19]
Baehr et al.

[11] 3,906,954
[45] Sept. 23, 1975

[54] OPHTHALMIC LIQUIFACTION PUMP

[75] Inventors: Edward F. Baehr, Berea; Jack B. Esgar, N. Olmsted; William J. McGannon, Lakewood, all of Ohio

[73] Assignee: The United States of America as represented by the National Aeronautics and Space Administration Office of General Counsel, Washington, D.C.

[22] Filed: Sept. 14, 1973

[21] Appl. No.: 397,478

[52] U.S. Cl. .............................. 128/305; 128/230
[51] Int. Cl.² .................... A61B 17/32; A61M 7/00
[58] Field of Search .................................. 128/305

[56] References Cited
UNITED STATES PATENTS

| | | | |
|---|---|---|---|
| 3,614,953 | 10/1971 | Moss | 128/305 |
| 3,732,858 | 5/1973 | Banko | 128/305 |
| 3,736,938 | 6/1973 | Evvard et al. | 128/305 |
| 3,776,238 | 12/1973 | Peyman et al. | 128/305 |

Primary Examiner—Channing L. Pace
Attorney, Agent, or Firm—N. T. Musial; J. A. Mackin; J. R. Manning

[57] ABSTRACT

A surgical tissue macerating and removal tool is disclosed wherein a rotating member having a cutting tip is utilized. When the instrument is to be used in an eye, a treatment fluid is supplied to the operative site and a first pump is provided to evacuate macerated material and treatment fluid from the eye. The rotating member may be disposed in a support tube having an aperture and communication with the first pump to provide for discharge of the macerated material and used treatment fluid. A second pump means is provided on the rotating member to provide a counter flow of treatment fluid into the space between the rotating member and the support tube. The second pump may provide additional support for the rotating member. Means is also provided for axially positioning rotating member to increase or decrease cutting action.

20 Claims, 4 Drawing Figures

OPHTHALMIC LIQUIFACTION PUMP

ORIGIN OF THE INVENTION

The invention described herein was made jointly by a non-governmental inventor and by employees of the United States Government. The invention may be manufactured and used by or for the Government of the United States of America for governmental purposes without the payment of any royalties thereon or therefor.

BACKGROUND OF THE INVENTION

The formation of a cataract in a human eye not only causes gradual loss of vision and eventual total blindness but, if allowed to progress to hypermaturity, may cause total degeneration of the eye. Restoring vision to an eye in which a cataract has formed involves completely removing the lens. This is an exeedingly delicate operation and requires a subsequent substantial immobility of the patient for approximately three weeks. Because of the relatively large incision made in the eye and the sutures required, any sudden or erratic movement within weeks after the operation may cause the eye to be irreparably damaged.

Accordingly, numerous instruments have been designed to be inserted into the eye through a small puncture to remove lens material or other materials such as blood clot, vitreous opacities, adhesions, and the like. A small puncture requires only one or two sutures, thereby requiring less immobilization time on the part of the patient.

Some instruments utilize vibrating chisel-shaped or pointed members. Some others provide treatment fluid under controlled pressure to the operative site and also provide suction to remove macerated material from the site. Complicated controls such as computers are required when suction is applied to the eye to prevent sudden increases in the suction as, for example, when macerated material blocking the suction passage suddenly breaks loose.

An instrument such as that shown in U.S. Pat. No. 3,736,938 utilizes a combination of an ultrasonically vibrating tube with a rotating cutter bit which has spiral grooves to evacuate macerated material along with used treatment fluid. Many ophthamologists, however, are concerned that using ultrasonic energy in the eye may cause damage as yet unknown.

A number of problems occur with regard to rotating a cutting member at high speed where the necessary removal of macerated material is to be accomplished without applying suction to the eye. Some of these problems include heating, loose tolerances required to reduce heating and its effects, and binding of the rotating cutter because of thickening and hardening of the macerated material as it is pumped out of the eye. Of course, the faster the cutter rotates, the more acute these problems become.

We are aware of U.S. Pat. No. 3,732,858 which discloses a hand-rotated cutter having spiral flutes or ridges which removes material such as the lens from an eye by a shearing action between jaws formed by the rotating member and the housing around the rotating member. Evacuation of sheared tissue is accomplished by suction.

It is an object of the invention to provide a tissue macerating and removal instrument including a cutting member which rotates in a tube at high speed.

Another object of the invention is to provide an instrument which removes blood clots, vitreous opacities, adhesions and the like from an eye by pumping action with the macerating action occurring entirely internal to the tool.

It is another object of the invention to provide a tissue macerating instrument having a rotating cutter disposed in a tube with a fluid flowing between said cutter and said tube toward the operative tip to center and cool said rotating cutter.

Still another object of the invention is to provide a tissue macerator of the foregoing type wherein a noncircular housing is disposed around the tube to provide passages for treatment fluid to the operative site and for the removal of macerated material and used treatment fluid.

yet another object of the invention is to provide a surgical instrument of the foregoing type wherein the rotating cutter member may be easily and quickly extended from or withdrawn into the tube.

A further object of the invention is to provide a surgical instrument of the foregoing type wherein macerated material and used treatment fluid flowing in one direction through the tube are opposed by a fluid flowing in the opposite direction whereby they and the counter flow are exhausted through an aperture in the tube.

Yet another object of the invention is to provide a surgical tissue macerating tool which does not require using a suction pump for evacuation of macerated material and used treatment fluid and avoids the application of excessive suction or suction fluctuations to the eye.

DESCRIPTION OF A PREFERRED EMBODIMENT

Figure 1:
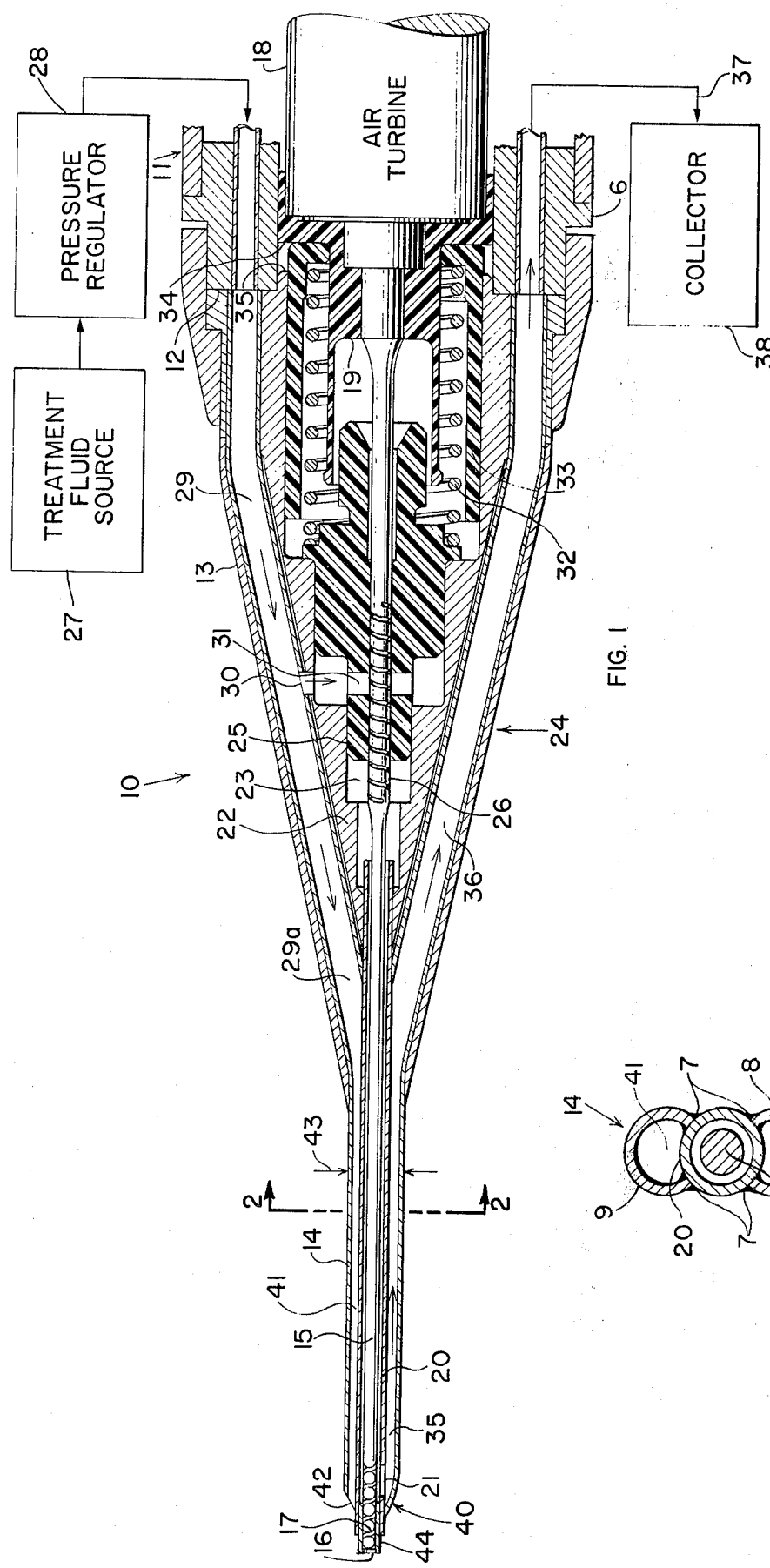
FIG. 1 is a longitudinal sectional view of a surgical tool embodying the invention.

Referring now to FIG. 1, there is shown a surgical instrument 10 comprising a suitable handle 11 (shown in part) attached to drive housing 6 having attached thereto at a surface 12 the component housing 13 which tapers to form a housing extension 14. To engage and macerate tissue, such as the lens of an eye for example, there is provided a rod 15 having at one end a cutting edge 16 from which there extends a screw portion 17. Screw 17 may be formed of spiral vanes or grooves. The other end of rod 15 is attached to a drive means 18, and is journaled in a drive motor positioning bushing 19. Rod 15 may be coated with a low-friction layer of suitable material such as Teflon, for example.

The bushing 19 extends over the outer surface of the air turbine 18 and slidably contacts the inner surface of handle 11 to allow the air turbine 18 to be positioned axially as will be described presently. Drive means 18 may be a high speed electric motor, a pneumatic motor, or an air turbine but is preferably a dental air turbine. Such a turbine operates at more than 300,000 revolutions per minute (RPM) and advantageously operates from any source of compressed air.

To the end that the screw portion 17 will pump macerated material away from the cutting tip 16, a tube 20 is disposed coaxially around rod 15. An aperture 21 is provided at one end of tube 20 and is positioned axially so that at least a portion overlaps the screw portion 17. In the preferred embodiment, aperture 21 is an axially extending slot. With this arrangement, macerated material will flow axially along the screw 17 and be centrifugally expelled through aperture 21.

The other end of tube 20 is retained in a component support member 22 and terminates in a cavity 23 provided in the support member 22. From this cavity, treatment fluid flows under pressure through the space between rod 15 and tube 20 and out through aperture 21 for the purpose of hydrodynamically centering rod 15, providing cooling and preventing the accumulation of protein matter in the space between the rod 15 and the tube 20 by a counterflow flushing action.

To accomplish this, there is provided a counterflow means such as auxiliary pump 24. Pump 24 is comprised of a pump body 25 disposed around rod 15 in the cavity 23 and a second screw portion 26 formed in the rod 15 over a portion of its length extending from a point within the bushing to a point in a cavity between the bushing 25 and the inner end of tube 20. As shown, the second screw portion 26 is formed by spiral grooves in rod 15. The pitch of these grooves is opposite to the pitch of the first screw portion 17 in order that both will pump material toward aperture 21.

The treatment fluid which is to be pumped toward aperture 21 by pump 24 is obtained from a pressurized treatment fluid source 27 via pressure regulator 28, conduit 29 and apertures 30 and 31 in said component support member 22 and said bushing 25, respectively. In its most basic form, the fluid source 27 may be a bottle which may be raised or lowered to obtain the desired pressure of from 15 to 30 mm of mercury. Preferably, treatment fluid is injected into the eye near the end of tube 20 by means of a passageway 41 which communicates with a conduit 29a which is an extension of conduit 29. As in the case of passage 35, passage 41 may be formed by spacing housing extension 14 from tube 20 to form a longitudinal half cylinder with an irrigation aperture 42 being located at the terminus of tube 9.

Figure 2:
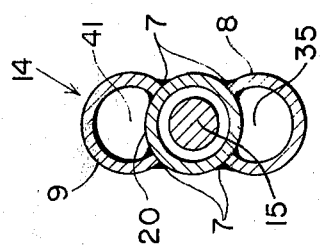
FIG. 2 is a cross-sectional view taken alone line 2—2 of FIG. 1.

Referring to FIG. 2, there is shown a view taken along line 2—2 of FIG. 1 and corresponding parts are identified by like numerals. As shown, extension 14 is formed of tubes 8 and 9 disposed along tube 15 and brazed as at 7. The tubes 8 and 9 may be whole tubes, half-tubes or tubes with longitudinal portions removed as shown. After the braze material is deposited as at 7, the extension has a substantially bi-convex shape. Alternatively, extension 14 may be a non-circular cross-section tube as will be discussed presently.

It will be understood that if housing extension 14 is cylindrical, longitudinal barriers will have to be disposed between tube 20 and housing extension 14 to maintain separation between the incoming treatment fluid and the outgoing mixture of macerated material and treatment fluid. To eliminate the need for baffles, the housing extension 14 may be of non-circular cross section as, for example, elliptical cross-section. The principal axis of the ellipse lies in the plane of the drawing as indicated at 43 and is substantially greater than the diameter of tube 20. The minor axis of the ellipse is perpendicular to the plane of the drawing and is of such length as to be in direct contact with tube 20. Forming passages 35 and 41 in this manner avoids attaching longitudinal tubes along tube 20 or the drilling of such passageways.

It will be understood that while housing extension 14 may be of elliptical cross-section, it may also be non-circular in cross-section to thereby provide longitudinally extending spaces between tube 20 and housing extension 14. Thus, if extension 14 were square in cross-section, for example, four longitudinal passageways would be formed.

Advantageously, as an alternative to the tubes 8 and 9 of FIG. 2, the passageway 35 may be formed by spacing the housing extension 14 away from tube 20 and tapering it to close on tube 20 as at 40.

In order to transmit the macerated material and treatment fluid discharged through aperture 21 to a remote point or to a suitable container, there is provided a passageway 35 through which aperture 21 communicates with a conduit 36. The conduit 36 may discharge the macerated material and treatment fluid through a suitable exhaust port in handle 11. Preferably, the conduit 36 is connected through a flexible tube 37 to an external receiver vessel 38. Conduit 36 may be formed by a groove in support housing 22, the outer wall being formed by housing 13.

During a surgical procedure such as a lens or blood clot removal, tissues of varying degrees of hardness may be encountered whereby it is desirable to increase or decrease the cutting action of a surgical instrument such as that described herein. To this end, the cutting tip 16 of rod 15 may be extended or withdrawn with respect to the one end of tube 20 by means of an axial adjustment mechanism which will now be described.

A coil spring 32 and a spring cup 33 are disposed around rod 15 in the component support member 22 between the air turbine 18 and the pump 24. Spring 32 and spring cup 33 bias the drive motor positioning bushing and the air turbine 18 rearwardly into the handle 11. Because rod 15 is attached to the air turbine 18, the cutting end 16 will, of course, move axially with turbine 18. To adjust the axial position of air turbine 18, as desired, there is provided an adjustment means which will be described hereinafter.

Figure 4:
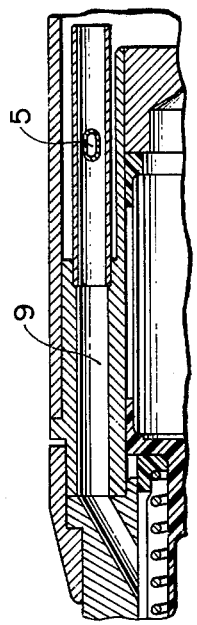
FIG. 4 is a partial sectional view of the structure of FIG. 1.

To avoid accumulation of treatment fluid and air in the cavity containing spring 32 and spring cup 33, a small air powered ejector 5 which communicates with the cavity through a suitable tube 9 is provided, as shown in FIG. 4. The extension of tube 9 is routed through handle 11 with other conduits as will be described presently. Ejector 5 produces a low pressure in tube 9 thereby drawing fluid and/or air out of the cavity containing spring 32 and spring cup 33.

Figure 3:
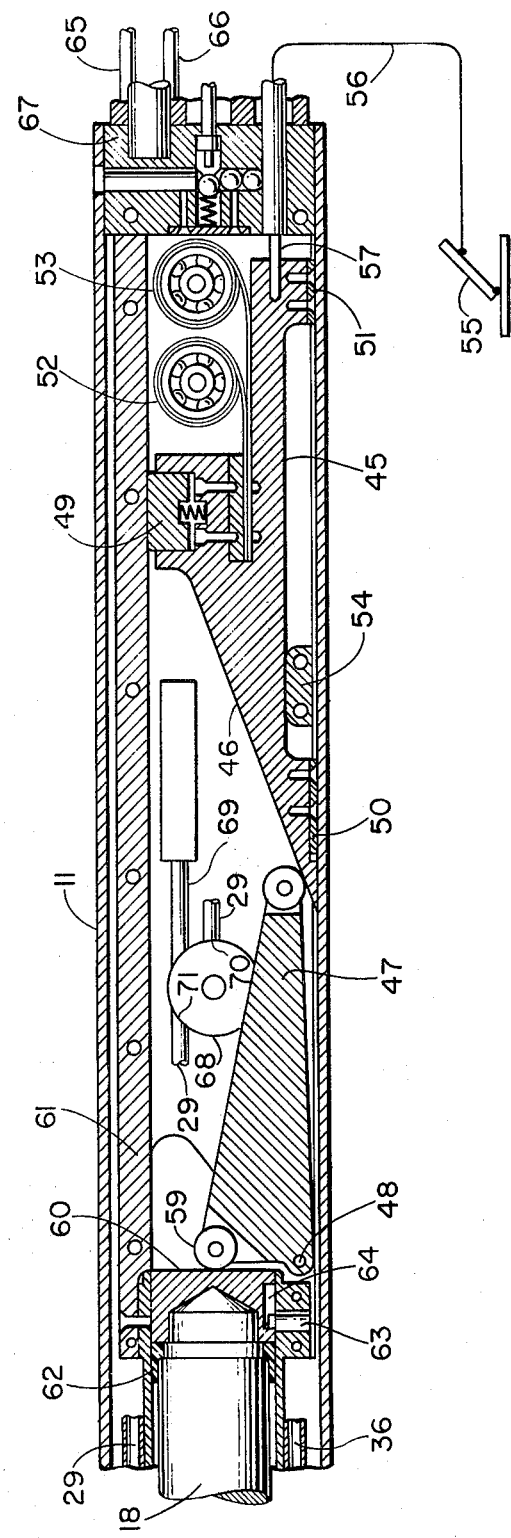
FIG. 3 is a longitudinal sectional view of a handle including an adjustment mechanism for the instrument embodying the invention.

Referring to FIG. 3, there is shown in longitudinal section the handle 11 which attaches to the housing 13 in FIG. 1 and the mechanism for axially positioning air turbine 18 to extend or retract the cutting tip 16. Components shown in FIG. 3 which correspond to those of FIG. 1 are identified by like numerals.

The mechanism for axially positioning turbine 18 comprises a cam 45 having a ramp 46 and a bell crank 47 which pivots on a pin 48. Cam 45 is biased by means of a spring mechanism 49 so that bearing pads 50 and 51 slidably engage the inner surface of handle 11. Springs 52 and 53 exert a rearward force on cam 45, the travel of which is limited by stop 54.

To actuate cam 45, there is provided a foot pedal 55 connected through a push cable 56 to a push rod 57 which is in contact with cam 45. With this arrangement, cam 45 is normally in its rearmost position and is moved forward to actuate a bell crank 47 when pedal 55 is depressed.

In order to convert a relatively great longitudinal movement of cam 45 into a very minute, precise axial movement of air turbine 18, the rearward end of bell crank 47 is provided with a bearing 58 which engages the ramp 46 of cam 45. Thus, as cam 45 moves forward when pedal 55 is depressed, the bearing 58 is wedged toward the center of handle 11 causing the bell crank 47 to pivot about pin 48. This causes a bearing 59 attached to the bell crank at a point above the pivot pen 48 to engage a push rod 60 which is slidably mounted in drive housing 6. An aft bearing sleeve 62 is disposed between the turbine 18 and the push rod 60.

It will be seen that forward movement of push rod 60, that is to the left as viewed in the drawing, will cause the cutting end 16 of rod 15 to be extended out of tube 20. The cutting end 16 will be retracted into tube 20 when food pedal 55 is released because the spring 32 of FIG. 1 biases turbine 18 and push rod 60 to their maximum rearward position. A maximum forward and rearward position of cutter 16, turbine 18 and push rod 60 is determined by a limiter 63 which extends into a slot 64 in push rod 60.

The tubes 65 and 66 are utilized to supply and exhaust air for the turbine 18, tube 29 to supply treatment fluid, tube 36 to carry away the macerated material, and tube 9 to remove fluid from the front cavity. All of these tubes are routed through handle 11 and terminate at end 67 of handle 11 in a suitable connector 68. A suitable passage through connector 68 is provided to exhaust air from turbine 18.

As shown schematically in FIG. 1, a pressure regulator 68 is connected between a fluid source 27 and conduit 29. In the actual ophthalmic instrument embodying the invention, a spring-loaded, diaphragm type pressure regulator 68 is disposed in a recess in handle 11, as shown in FIG. 3. The pressure regulator 68 includes a surge chamber 69 and has an inlet 70 and an outlet 71. As shown, inlet 70 is connected to a conduit 29 which passes up through handle 11 and out through enclosure 67. Outlet 71 is likewise connected to conduit 29 which connects to and may be contiguous with conduit 29 shown in FIG. 1. Thus, the pressure regulator 68 is disposed in the conduit 29 through which treatment fluid is directed through passageway 41 to the aperture 42 at the end of extension 14.

Referring again to FIG. 1, there is shown a cylindrical centering bushing 44 retained in tube 20. This bushing centers rod 15 when rod 15 is much smaller than tube 20. With the close tolerances which may be achieved in the instrument embodying the invention, bushing 44 is not required.

The surgical instrument described herein has been used successfully to remove the lenses from live rabbits and cats.

To illustrate the smallness and preciseness of the instrument embodying the invention, some of the dimensions are as follows:

handle 11 has a ⅝-inch outside diameter;
rod 15 has a 0.035-inch diameter where it runs in tube 20;
tube 20 has a 0.040-inch inside diameter and a 0.048-inch outside diameter; and
aperture 21 is 0.060-inch long by 0.035-inch wide.

It will be understood that those skilled in the art may make changes and modifications to the surgical tool described herein without departing from the spirit and scope of the invention, as set forth in the claims appended herein.

What is claimed is:

1. A surgical tissue macerating and removing instrument comprising:
   a cylindrical tube open at least at one end and having at least one aperture in its wall;
   a rod disposed in said tube for rotation therein, said rod being formed into a first archimedes screw portion at one end, said first archimedes screw portion extending between said one end of said tube and said aperture in said tube;
   a cutting edge being disposed at said one end of said rod;
   drive means for rotating said rod at a speed sufficient to cause a pumping action from said open end of said tube toward said aperture; and
   first counterflow means for directing a liquid into the space between said rod and said tube in a direction providing a first counterflow toward said aperture and said open end of said tube.

2. The apparatus of claim 1 wherein said first counterflow means comprises a pump body disposed around said rod between said drive means and the other end of said tube, said rod being formed into a second archimedes screw over a portion of its length extending from a point within said pump body to a point beyond said pump body in a direction toward said tube, said second screw being of opposite pitch to the first screw, said second screw communicating with a source of treatment fluid through a passageway in said pump body and with said other end of said tube.

3. The structure of claim 2 wherein said pump body is a graphite-impregnated polyimide whereby it also functions as a low friction bearing for said rod.

4. The apparatus of claim 2 and including a first conduit disposed along said tube between said aperture in said tube and an exhaust port in a handle which supports said drive means, said rod and said apertured tube.

5. The apparatus of claim 4 and including a second conduit disposed along said tube, said second conduit being open at one end adjacent said one end of said tube and communicating with a source of treatment fluid to provide a second counterflow.

6. The apparatus of claim 5 wherein said treatment fluid source is pressurized and including a pressure regulator disposed between said second conduit and said source of treatment fluid to prevent pressure surges.

7. The apparatus of claim 6 wherein said pressure regulator is located within the handle of the tool.

8. The apparatus of claim 2 and including a housing of non-circular cross-section disposed around said tube to form at least two separate additional passageways, said housing closing on said tube at said one end and having at least one aperture in said closing portion opening into at least one of said passageways.

9. The structure of claim 8 wherein said housing is of elliptical cross-section.

10. The apparatus of claim 1 and including means for axially positioning said rotating rod whereby said one end may be extended or retracted with respect to said one end of said tube.

11. The apparatus of claim 10 wherein said rod is attached to said drive means, said drive means being slidably disposed in a support member attached to a handle, and including means for biasing said drive means into said handle and means for limiting axial movement of said drive means.

12. The apparatus of claim 11 wherein said means for biasing comprises a coil spring disposed coaxially around said rod in a cavity between said counterflow means and said drive means.

13. The apparatus of claim 11 including actuating means for selectively advancing said drive means against the pressure of said means for biasing said drive means.

14. The apparatus of claim 11 and including means for evacuating any treatment fluid or air leakage from said cavity to an external receiver.

15. The apparatus of claim 14 wherein said evacuating device is an air powered ejector.

16. The apparatus of claim 15 wherein said air powered ejector is located within handle of said tool.

17. The apparatus of claim 1 wherein said drive means is an air turbine.

18. The apparatus of claim 1 wherein said drive means is an electric motor.

19. The apparatus of claim 1 wherein said drive means rotates said rod at a speed of from about 2,000 rpm to about 300,000 rpm.

20. The apparatus of claim 1 wherein said aperture is an axially extending slot.

* * * * *